# 2,802,002

SERIES OF NEW N-(5-NITRO-2-FURYL) ALKYL-IDENE-3-AMINO-5-TERTIARYAMINO - METHYL-2-OXAZOLIDONES AND THE PREPARATION THEREOF

Gabriel Gever, Oxford, N. Y., assignor to The Norwich Pharmacal Company, Norwich, N. Y., a corporation of New York No Drawing. Application July 18, 1956,
Serial No. 598,503

13 Claims. (Cl. 260—240)

This invention relates to a new series of chemical compounds which exhibit a high order of in vivo chemotherapeutic effectiveness against microbial infections upon oral administration and which are well tolerated by the host when so administered, and the preparation thereof. It is a further feature of this invention that the acid addition and quaternary ammonium salts of this new series of compounds are effective upon oral administration, and also lend themselves to effective parenteral therapy. This new series of chemical compounds consists of a number of closely-related nitrofurans which may be described as N-(5-nitro-2-furfurylidene)-3-amino-5-tertiaryaminomethyl-2-oxazolidones and the acid addition and quaternary ammonium salts thereof. They are described by the general formula:

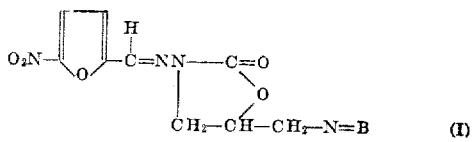

(I)

wherein —N=B represents a member of the group consisting of di-lower-alkylamino, arylalkylamino, piperidyl, pyrrolidyl and morpholinyl, and the acid addition and alkyl halide quaternary ammonium salts thereof.

A further feature of my invention is the provision of a new series of closely-related 3-amino-5-tertiaryamino-methyl-2-oxazolidones which can be employed as intermediates in the production of the members of my new series of nitrofurans, and the preparation of such intermediates.

The preparation of my new series of intermediates, according to the method which I now prefer, involves the reaction of a 1-hydrazino-3-tertiaryamino-2-propanol and an alkyl carbonate, preferably diethyl carbonate. Schematically, this reaction may be represented by the following equation:

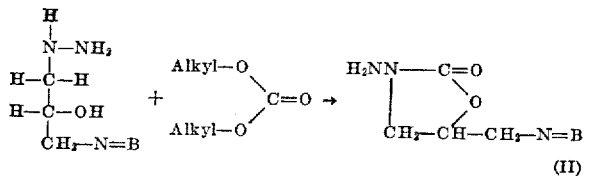

(II)

wherein —N=B represents a member of the group consisting of di-lower-alkylamino, arylalkylamino, piperidyl, pyrrolidyl and morpholinyl radicals.

The reactants are heated together and any alcohol formed during the reaction may be removed by distillation to encourage the reaction to proceed to completion. An alkaline metal catalyst in small quantity is desirable in the reaction mixture in order that the reaction will take place smoothly. Such a catalyst is sodium methylate.

The conversion of a member of my new series of intermediates into the corresponding nitrofuran, according to the method which I now prefer, consists in reacting 5-nitro-2-furaldehyde with the selected intermediate. Schematically such a reaction may be represented by the following equation:

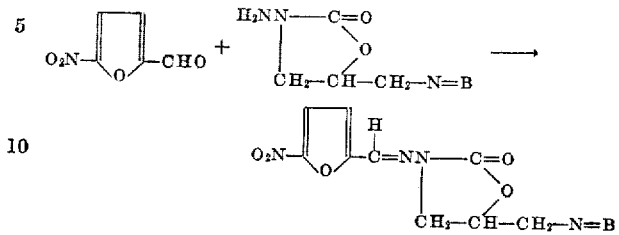

wherein —N=B represents a member of the group consisting of di-lower-alkylamino, arylalkylamino, piperidyl, pyrrolidyl and morpholinyl radicals.

The compounds included within my new series of nitrofurans which are embraced within Formula I can be converted into the acid addition and quaternary ammonium salts thereof through the reaction of such compound with inorganic acids such as hydrochloric and sulfuric or an organic acid such as penicillin, or by quaternization with an alkyl halide.

I have discovered that members of this series of compounds permit an astonishingly effective therapeutic treatment of animals lethally infected with pathogenic organisms such as *S. typhosa*, *S. pyogenes*, *S. cholera-esuis*, *V. comma* and trypanosomes. The dosage of various members of this series needed to bring about an effective chemotherapeutic result is within a tolerable range and provokes no manifestation of toxic or untoward effects. The high chemotherapeutic ratio resident within this series permits spacing of doses within accepted time intervals. In many instances, a single dose will serve as effectively as a multiple regimen.

I have discovered also that the aforementioned salts retain the highly effective chemotherapeutic attributes of the basic compound when administered per os to animals lethally infected with pathogenic organisms and in addition lend themselves to the parenteral mode of administration. Among these acid addition salts, the penicillin salt produced by the reaction of penicillin G with, for example, N - (5-nitro-2-furfurylidene) - 3-amino-5-(1-piperidyl)-methyl-2-oxazolidone has been found to yield astonishingly excellent results when administered to animals lethally infected with pathogenic bacteria. While the penicillin salt recited here by way of illustration refers to penicillin G, other penicillins such as penicillin K, F, X and dihydro F, or mixtures of two or more of these as obtained from the mold-growth methods of obtaining "penicillin" are operative and are included within the scope of this invention.

A similar achievement of chemotherapeutic effectiveness is obtained upon using the hydrochloride salt of the aforementioned basic compound. This salt can be administered per os in the manner referred to above in the case of the basic compound or the penicillin salt thereof and, like the penicillin adduct, can be administered parenterally, offering an even greater water solubility for use by this route.

In order that this invention may be entirely available to those skilled in the art, methods for making a number of the new compounds of the series, and the intermediates therefor, are described briefly:

EXAMPLE I

A.—*3-amino-5-(1-piperidyl)methyl-2-oxazolidone*

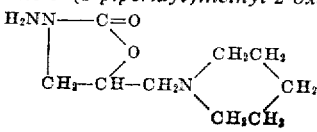

To 23 g. of hydrazine hydrate (100%) at 80° C. is added with stirring 12 g. of 3-(1-piperidyl)-1,2-epoxypropane (Eisleb, U. S. 1,790,042) at such a rate that the temperature is maintained at 80–90° C. without external cooling. The resulting solution is heated on the steam bath for two hours and then the excess hydrazine hydrate removed in vacuo.

To the residual oil is added 8 grams of diethyl carbonate and a solution of 0.1 g. of sodium in 3 cc. of methanol. The reaction mixture is then heated, the alcohol formed in the reaction being slowly removed by distillation. After about two hours the mixture is cooled. The solid which precipitates is removed by filtration, washed with absolute alcohol and then with ether. Yield 44%, M. P. 128–129° C.

B.—N-(5-nitro-2-furfurylidene)-3-amino-5-(1-piperidyl)-methyl-2-oxazolidone

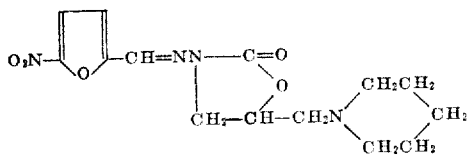

It is not necessary that the intermediate be separated from the reaction medium in the preparation of the end product. Instead, the reaction mixture, after cooling, is treated with 50 cc. of water and acidified with concentrated hydrochloric acid. A solution of 7 g. of 5-nitro-2-furaldehyde in 25 cc. of alcohol is then added, a small amount of insoluble material removed by filtration and the filtrate made alkaline with saturated sodium carbonate solution. The resulting solid is collected by filtration, washed with water and then a little cold alcohol. After recrystallization from alcohol, there is obtained 7.0 g. of N - (5 - nitro-2-furfurylidene)-3-amino-5-(1-piperidyl)-methyl-2-oxazolidone, M. P. 194–196° C. Further recrystallization from alcohol raises the melting point to 197–198° C.

The hydrochloride salt can be readily prepared by suspending 12.0 g. of the above compound in 100 cc. of absolute alcohol, adding 10 cc. of concentrated hydrochloric acid and cooling the resulting solution. The 12.0 g. of hydrochloride salt thus obtained decomposes at about 250° C. The sulfate salt can be similarly prepared using sulfuric acid instead of hydrochloric acid.

The penicillin salt is prepared by slowly adding a solution of 75 g. of N-(5-nitro-2-furfurylidene)-3-amino-5-(1-piperidyl)methyl-2-oxazolidone hydrochloride in 690 cc. of warm water to an ice cold solution of 80 g. of potassium penicillin G in 150 cc. of water. The penicillin salt is removed by filtration and after drying over calcium chloride in vacuo weighs 110 g., M. P. 116–118° C.

C.—N-(5-nitro-2-furfurylidene)-3-amino-5-(1-piperidyl)-methyl-2-oxazolidone methoiodide

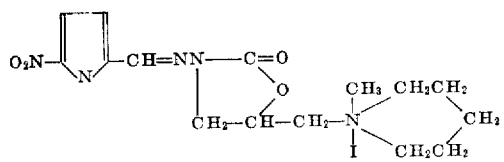

A mixture of 5.0 g. of N-(5-nitro-2-furfurylidene)-3-amino-5-(1-piperidyl)methyl-2-oxazolidone, 6.0 g. of methyl iodide and 150 cc. of ethyl acetate is refluxed for twelve hours. At the end of this time the mixture is filtered hot and the precipitate well washed with ethyl acetate. There is obtained 6.0 g., 83%, of product, M. P. 260° with decomposition. For further purification, the material may be recrystallized from nitromethane.

EXAMPLE II

A.—3-amino-5-dibutylaminomethyl-2-oxazolidone

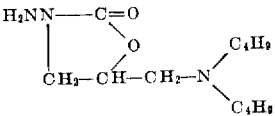

To 112.5 g. of epichlorohydrin and 2.4 cc. of water is slowly added 129.2 g. of dibutylamine, keeping the temperature at 20–30° C. The reaction mixture is then stirred at 30° C. for five hours and then washed with 125 cc. of 20% potassium carbonate solution. The organic layer is then stirred for one hour at 27–30° C. with 160 cc. of 36% sodium hydroxide solution. The resulting oil is separated from the caustic solution, dried over solid potassium hydroxide and distilled in vacuo. There is obtained 99 g. of 3-dibutylamino-1,2-epoxypropane, B. P. 107–111° C. at 13 mm.

To 12.5 g. of hydrazine hydrate (100%) at 80° C. is slowly added 92.6 g. of 3-dibutylamino-1,2-epoxypropane, keeping the temperature at 80–90° C. The reaction mixture is then stirred at 90–95° C. for three hours and the excess hydrazine removed in vacuo.

To 100 g. of the residual oil is added 84 g. of diethyl carbonate and a solution of 2.0 g. of sodium in 40 cc. of methanol. The reaction mixture is then heated and the alcohol formed in the reaction is slowly distilled. After about four hours, the residue is treated with 100 cc. of water and 25 cc. of alcohol and acidified with concentrated hydrochloric acid.

B.—N-(5-nitro-2-furfurylidene)-3-amino-5-dibutyl-aminomethyl-2-oxazolidone

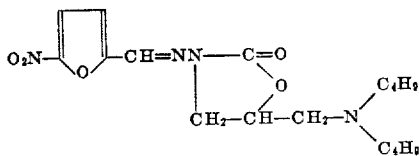

It is not necessary that the intermediate be separated from the reaction medium in the preparation of the end product. Instead, a solution of 35.2 g. of 5-nitro-2-furaldehyde in 50 cc. of alcohol is added to the reaction medium and the solution neutralized with a saturated solution of sodium carbonate. The precipitate which appears is removed by filtration and recrystallized from alcohol. There is obtained 19 g. of N-(5-nitro-2-furfurylidene) - 3 - amino - 5-dibutylaminomethyl-2-oxazolidone. M. P. 152.5–153.5° C.

The penicillin salt is prepared in the manner described under Example I.

EXAMPLE III

A.—3-amino-5-(1-pyrrolidyl)methyl-2-oxazolidone

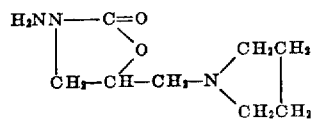

To 50 g. of epichlorohydrin at 0° C. is slowly added 40 g. of pyrrolidine, keeping the temperature at 0–5° C. The solution is stirred at 0–10° C. for thirty minutes and at 30–35° C. for one hour. The reaction mixture is washed with 125 cc. of 20% potassium carbonate solution and then stirred with 75 cc. of 36% sodium hydroxide solution for one hour. The resulting oil is separated and the aqueous layer extracted with 100 cc. of ether. The combined organic layers are dried over KOH, the ether removed and the residual oil distilled in vacuo. There is obtained 39 g. of 3-(1-pyrrolidyl)-1,2-epoxypropane, B. P. 78° C. at 20 mm.

The 39 g. of 3-(1-pyrrolidyl)-1,2-epoxypropane is added dropwise to 80 g. of hydrazine hydrate keeping the temperature at 90–100° C. The solution is heated on the steam bath for one hour and the excess hydrazine hydrate is removed in vacuo. To the residue is added 44 g. of diethyl carbonate and a solution of 1.0 g. of sodium in 19 cc. of methanol. The reaction mixture is heated, the alcohol formed by the reaction being slowly distilled. After about ninety minutes, the residue is diluted with 100 cc. of water and acidified with concentrated hydrochloric acid.

B.—*N-(5-nitro-2-furfurylidene)-3-amino-5-(1-pyrrolidyl)methyl-2-oxazolidone*

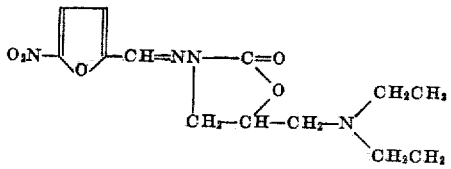

A solution of 40 g. of 5-nitro-2-furaldehyde in 150 cc. of alcohol is added to the reaction medium prepared through step A, the solution extracted with ether to remove any excess aldehyde and the aqueous portion made alkaline with saturated sodium carbonate solution. The resulting solid is removed by filtration, washed with water and alcohol and recrystallized from alcohol-nitromethane (200:175). There is obtained 39.4 g. of N-(5-nitro-2-furfurylidene) - 3 - amino - 5 - (1 - pyrrolidyl)methyl - 2-oxazolidone, M. P. 207–208° C.

The hydrochloride is prepared by suspending 5.4 g. of the above compound in 55 cc. of absolute alcohol, adding 5 cc. of concentrated hydrochloric acid and cooling. The 5.9 g. of resulting hydrohcloride melts at 285° C. with decomposition.

EXAMPLE IV

A.—*3-amino-5-(N-morpholinyl)methyl-2-oxazolidone*

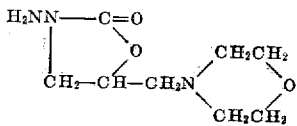

11.17 g. (0.78 mole) 3-(N-morpholinyl)-1,2-epoxypropane, B. P. 76.5–78° C. 3.9 mm., prepared by Eisleb's method for 3-(1-piperidyl)-1,2-epoxypropane (U. S. 1,790,042) is added dropwise in 12 minutes to 19.5 g. (.39 mole) 100% hydrazine hydrate, which has been warmed to 85° C. on the steam bath, and is being mechanically stirred. The heat of the reaction maintains the internal temperature at 90–100° C. without further external heating. The reaction mixture is then warmed on the steam bath for an additional two hours (90–95° C.). The excess hydrazine hydrate is removed in vacuo. The residue of viscous 1-hydrazino-3-morpholinyl-2-propanol is not distilled, but is mixed with 10.16 g. (.086 mole) diethyl carbonate and a solution of 0.3 g. sodium metal in 15 ml. methyl alcohol. The mixture is refluxed about 2 hours under a 15 cm. Widmer column, the alcohol being removed leaving a thick, green liquid residue, which is cooled and the precipitate which forms is removed by filtration and washed well with ether. Yield 82%, M. P. 114–116° C. Recrystallization from isopropanol gives purified material, M. P. 120° C.

B.—*N-(5-nitro-2-furfurylidene)-3-amino-5-(N-morpholinyl)methyl-2-oxazolidone*

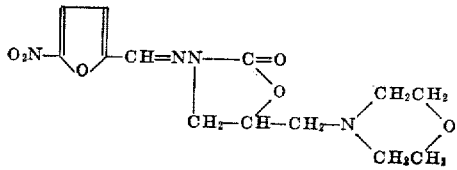

It is not necessary that the intermediate be separated from the reaction medium in the preparation of the end product. Instead, the reaction mixture, after cooling, is treated with 200 ml. of water, acidified with 42 ml. 10% hydrochloric acid solution, and filtered. To the clear, light yellow filtrate is added dropwise a solution of 9.8 g. (.07 mole) 5-nitro-2-furaldehyde in 100 ml. ethyl alcohol. An orange solution of the hydrochloride results. The free base is precipitated as yellow plates by making the solution basic with saturated sodium carbonate solution. 14 g. of the compound is filtered off by suction, washed with alcohol, and dried. The yield, M. P. 204–205° C. (d.), is 53% of theoretical based on 3-(N-morpholinyl) - 1,2 - epoxypropane. Recrystallization from 95% alcohol (75% recovery) raises the melting point to 206° C. (d.).

The hydrochloride salt is isolated quantitatively by suspending the base in alcohol and adding sufficient aqueous concentrated HCl solution. The precipitate becomes pale yellow, is filtered off, and recrystallized from 80% alcohol. The melting point range is ca. 223–228° C. (d.).

EXAMPLE V

A.—*3-amino-5-phenylmethylaminomethyl-2-oxazolidone*

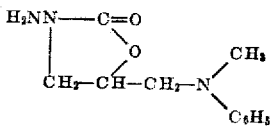

65 g. (0.4 mole) of 3-phenylmethylamino-1,2-epoxypropane, prepared by Eisleb's method (U. S. 1,790,042), is added dropwise in 22 minutes to 100 g. (2 moles) 100% hydrazine hydrate, which has been warmed to 82° C. on the steam bath, and is being mechanically stirred. The heat of the reaction maintains the internal temperature at 90–100° C. without further external heating. The reaction mixture is then warmed on the steam bath for an additional two hours (92° C.). The excess hydrazine hydrate is removed in vacuo. The residue of viscous 1-hydrazino-3-phenylmethylamino-2-propanol is not distilled, but is mixed with 53 g. (.44 mole diethyl carbonate and a solution of 1.52 g. sodium metal in 50 ml. methyl alcohol. The mixture is refluxed on the steam bath four hours, giving a clear, green solution, which is acidified with 200 ml. 10% hydrochloric acid solution.

B.—*N-(5-nitro-2-furfurylidene)-3-amino-5-phenylmethylaminomethyl-2-oxazolidone*

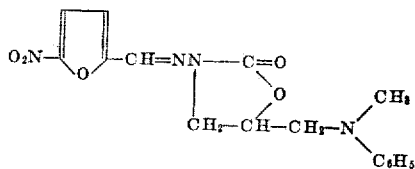

To the clear, deep yellow solution, which results, from following the procedure outlined in step A, is added dropwise a solution of 42 g. (0.3 mole) 5-nitro-2-furaldehyde in 250 ml. ethyl alcohol. The orange solid which soon starts to precipitate is the free base, M. P. 212–214° C. Recrystallization from a 2·1 alcohol-nitromethane solution or from glacial acetic acid, raises the melting point to 214–215° C., yield 62 g. or 45% of theoretical based upon the starting phenylmethylamino-1,2-epoxypropane.

The hydrochloride can be formed by suspending the free base in absolute alcoholic HCl. After a short time, solution is attained followed by precipitation of a pale yellow solid.

EXAMPLE VI

A.—3-amino-5-dibenzylaminomethyl-2-oxazolidone

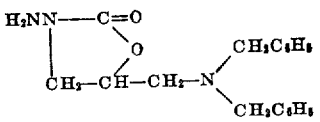

A solution of 156 g. (.79 mole) of dibenzylamine and 85 g. (.92 mole) of epichlorohydrin in 300 cc. of toluene is refluxed for 5 hours. The internal temperature rises from 115 to 120° C. during this period. The solution is cooled to 35° C. and treated with 100 cc. of 50% sodium hydroxide, then stirred for 1.75 hours. 125 cc. of water is added to dissolve the salt that separates and the organic layer is separated. To the organic layer is added 200 g. (4 moles) of 100% hydrazine hydrate and the mixture refluxed 2.25 hours with stirring. The toluene-hydrazine-water azeotrope is then distilled at 90–95° C. and the residue heated in vacuo to remove the toluene and hydrazine. Methanol is added to the residue followed by sufficient methanolic potassium hydroxide to make the mixture strongly alkaline. The precipitated potassium chloride is filtered and washed well with methanol. The methanol is distilled and the residue pumped in vacuo at 100° C. To the thick residue is added 125 g. (1.06 moles) of diethyl carbonate and a solution of 3 g. (.13 mole) of sodium in methanol. This mixture is heated with stirring in an oil bath rising from 110 to 133° C. during 2 hours to remove the alcohol formed. The hot residue is then heated in vacuo to remove all volatile material.

B.—N-(5-nitro-2-furfurylidene)-3-amino-5-dibenzylaminomethyl-2-oxazolidone

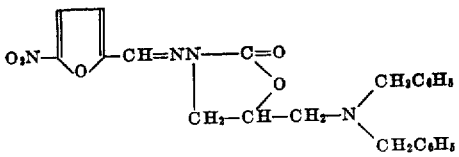

The crude 3-amino-5-dibenzylaminomethyl-2-oxazolidone is isolated and purified as its 5-nitro-2-furaldehyde derivative by dissolving the crude material in alcohol, acidifying with hydrochloric acid and adding an alcoholic solution of 5-nitro-2-furaldehyde. This mixture is neutralized with sodium carbonate solution to precipitate N-(5-nitro-2-furfurylidene)-3-amino-5-dibenzylaminomethyl-2-oxazolidone. The crude nitrofuran compound is recrystallized from 1:1 nitromethane:alcohol using charcoal giving 64 g. (18.5% based on dibenzylamine) of the pure compound melting at 163–165° C.

EXAMPLE VII

A.—3-amino-5-diethylaminomethyl-2-oxazolidone

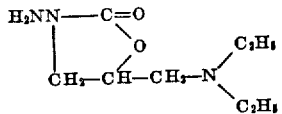

To a mixture of 99 g. (.615 mole) of 1-hydrazino-3-diethylamino-2-propanol (prepared from hydrazine hydrate and 3-diethylamino-1,2-epoxypropane) and 80 g. (.678 mole) of diethyl carbonate is added in one portion 5.4 g. (.1 mole) of dry sodium methoxide. An exothermic reaction takes place as the solid dissolves and the mixture turns green. This mixture is heated, with stirring, in an oil bath. During 2 hours, at a bath temperature rising from 110° to 113° C., there is collected 68.5 cc. of distillate (95% of the theory) boiling at 76–77.5° C. The hot residue in the reaction flask is then pumped free of volatile material on the vacuum pump leaving 117 g. of residue.

10 g. of this residue is dissolved in 10% sulfuric acid and treated with excess barium carbonate. The precipitates of barium sulfate and carbonate are filtered and washed well with water. The clear aqueous solution is evaporated on the steam bath and then dried over KOH in vacuum. 6.7 g. of the viscous syrup that remained is distilled in vacuo, giving 2.7 g. of colorless, viscous liquid boiling at 138.5° C. at 1.6 mm.

B.—N-(5-nitro-2-furfurylidene)-3-amino-5-diethylaminomethyl-2-oxazolidone

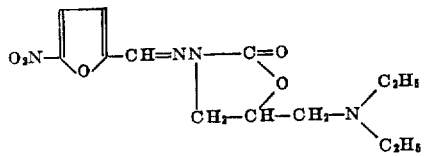

An aqueous solution of the above-described compound is acidified with hydrochloric acid and an alcoholic solution of 5-nitro-2-furaldehyde is added thereto as described in Example II, B. The solution is neutralized with a saturated solution of sodium carbonate. The precipitate which appears is removed by filtration and recrystallized from alcohol; M. P. 170–171° C.

This application is a continuation-in-part of my copending application Serial No. 373,672, filed August 11, 1953, and of my copending application Serial No. 373,674 filed August 11, 1953, now abandoned.

What I claim is:

1. The method of preparing a N-(5-nitro-2-furfurylidene)-3-amino-5-tertiaryaminomethyl-2-oxazolidone represented by the formula:

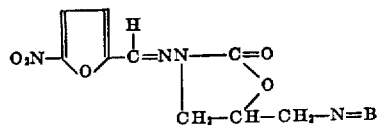

wherein —N=B represents a member of the group consisting of di-lower-alkylamino, arylalkylamino, piperidyl, pyrrolidyl and morpholinyl which comprises causing a 3-amino-5-tertiaryaminomethyl-2-oxazolidone represented by the formula:

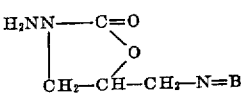

wherein —N=B has the significance given above, to react in acidified solution with 5-nitro-2-furaldehyde.

2. A member of the group consisting of a compound having chemotherapeutic activity on oral administration and represented by the formula:

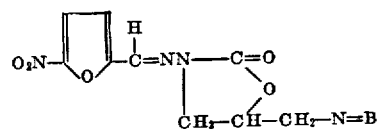

wherein —N=B represents a member of the group consisting of di-lower-alkylamino, arylalkylamino, piperidyl, pyrrolidyl and morpholinyl, and the acid addition and alkyl halide quaternary ammonium salts thereof.

3. N-(5-nitro-2-furfurylidene)-3-amino-5-(1-piperidyl)-methyl-2-oxazolidone represented by the formula:

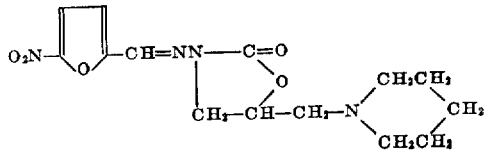

4. N - (5 - nitro - 2 - furfurylidene) - 3 - amino - 5- dibutylaminomethyl - 2 - oxazolidone represented by the formula:

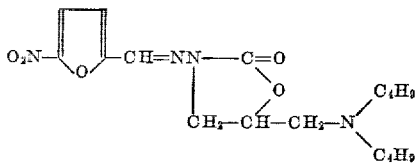

5. N - (5 - nitro - 2 - furfurylidene) - 3 - amino - 5- (1-pyrrolidyl)methyl-2-oxazolidone represented by the formula:

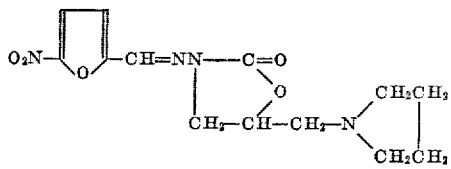

6. N - (5 - nitro - 2 - furfurylidene) - 3 - amino - 5- (N-morpholinyl)methyl-2-oxazolidone represented by the formula:

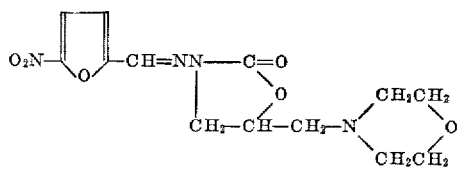

7. N-(5-nitro-2-furfurylidene) - 3 - amino - 5 - phenylmethylaminomethyl - 2 - oxazolidone represented by the formula:

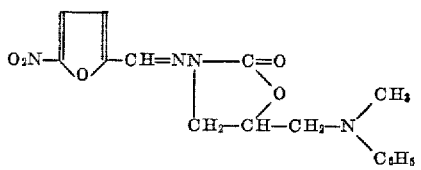

8. A new chemical compound represented by the formula:

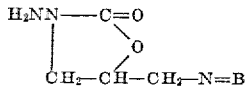

wherein —N=B represents a member of the group consisting of di-lower-alkylamino, arylalkylamino, piperidyl pyrrolidyl and morpholinyl.

9. 3-amino-5-(1-piperidyl)methyl-2-oxazolidone represented by the formula:

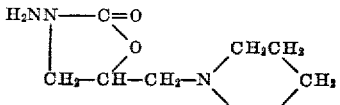

10. 3-amino-5-(N - morpholinyl)methyl-2-oxazolidone represented by the formula:

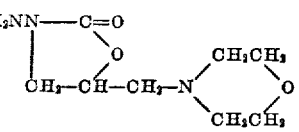

11. 3-amino-5-(1-pyrrolidyl)methyl - 2 - oxazolidone represented by the formula:

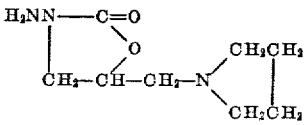

12. The method of preparing a 3-amino-5-tertiary-aminomethyl-2-oxazolidone represented by the formula:

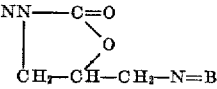

wherein —N=B represents a member of the group consisting of di-lower-alkylamino, arylalkylamino, piperidyl, pyrrolidyl, and morpholinyl, which comprises causing a 1-hydrazino-3-tertiaryamino-2-propanol represented by the formula:

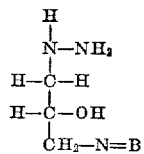

wherein —N=B has the significance given above, to react with an alkyl carbonate.

13. The method according to claim 12 wherein the alkyl carbonate is diethyl carbonate.

No references cited.

UNITED STATES PATENT OFFICE
Certificate of Correction

August 6, 1957

Patent No. 2,802,002

Gabriel Gever

It is hereby certified that error appears in the printed specification of the above numbered patent requiring correction and that the said Letters Patent should read as corrected below.

Column 3, lines 60 to 63, left-hand portion of the formula should appear as shown below instead of as in the patent—

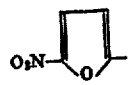

column 5, line 25, for "solium" read —sodium—; column 6, line 68, for "2.1" read —2:1—; column 8, line 32, for "tertiarylaminomethyl" read —tertiaryaminomethyl—; column 10, line 1, after "piperidyl" insert a comma.

Signed and sealed this 10th day of December 1957.

[SEAL]

Attest:
KARL H. AXLINE,
Attesting Officer.

ROBERT C. WATSON,
Commissioner of Patents.